C. E. ELLIOTT ET AL
March 28, 1933. FRUIT JUICE EXTRACTOR Re. 18,778
Filed Jan. 25, 1928 2 Sheets-Sheet 1
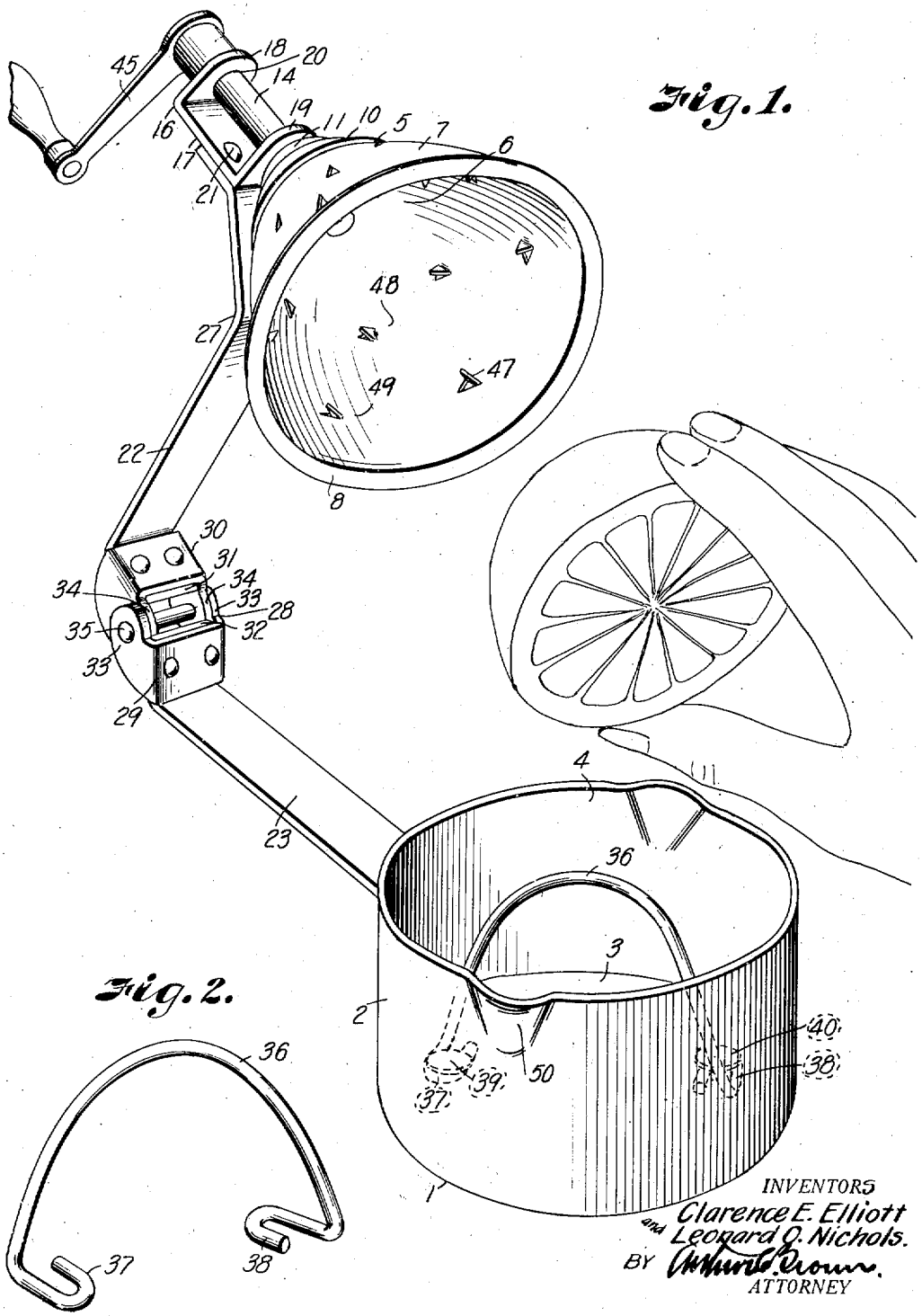
INVENTORS
Clarence E. Elliott
and Leonard O. Nichols.
BY Arthur S. Brown.
ATTORNEY C. E. ELLIOTT ET AL
March 28, 1933. FRUIT JUICE EXTRACTOR Re. 18,778
Filed Jan. 25. 1928 2 Sheets-Sheet 2
Fig. 5.
Fig. 3.
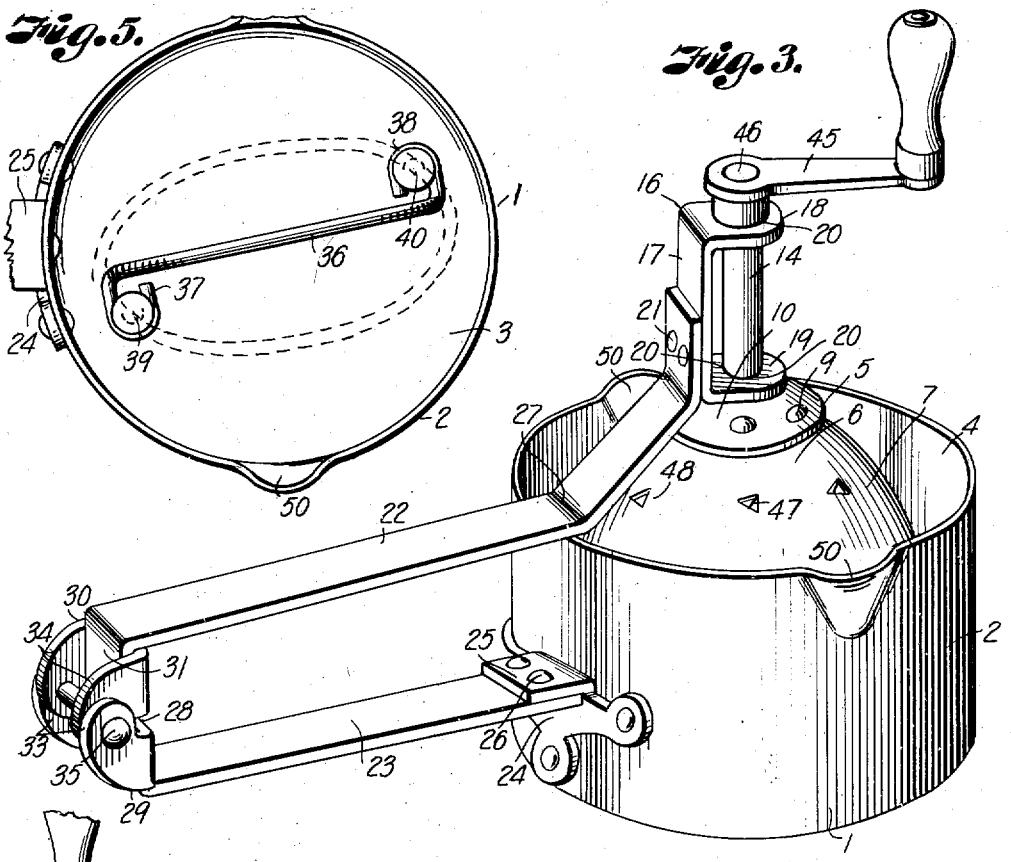
Fig. 4.
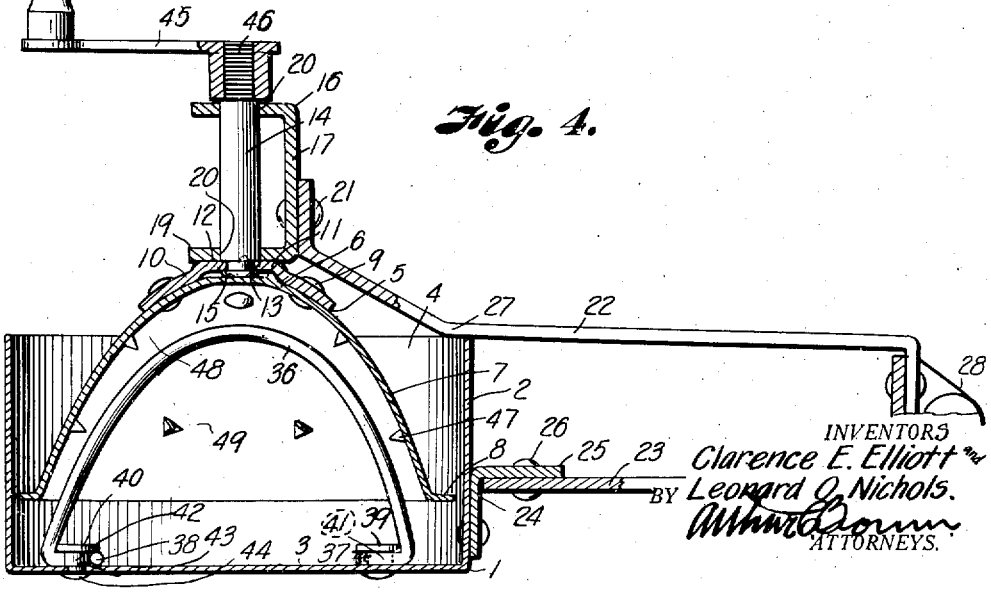
INVENTORS
Clarence E. Elliott
BY Leonard O. Nichols.
Arthur Comm
ATTORNEYS.

Reissued Mar. 28, 1933 Re. 18,778

UNITED STATES PATENT OFFICE

CLARENCE E. ELLIOTT AND LEONARD O. NICHOLS, OF KANSAS CITY, MISSOURI, ASSIGNORS TO KNAPP MONARCH COMPANY, INC., OF ST. LOUIS, MISSOURI, A CORPORATION OF MISSOURI

FRUIT JUICE EXTRACTOR

Original No. 1,743,661, dated January 14, 1930, Serial No. 249,258, filed January 25, 1928. Application for reissue filed January 13, 1932. Serial No. 586,448.

Our invention relates to juice extractors and more particularly to a device for extracting the juices from oranges, lemons, citrus and other like fruits, and has for its principal object to provide for the complete extraction of such juices with facility and extreme rapidity.

A further object of our invention is to separate the seeds and pulp from the juice so as to obtain the juice in its purest quality when pouring the same from the receptacle.

Another important object of the invention is to provide a device inexpensive of manufacture in that the various parts may all be formed of metal stampings and the parts readily assembled and secured together.

A still further object of the invention is to provide a fruit juice extractor having a rotatable fruit carrier upon which hand pressure is exerted as the fruit is forced over the reamer or juice extracting member.

Other and further objects of our invention will be apparent from the following specification taken in conjunction with the accompanying drawings, wherein—

Figure 1 is a perspective view of the preferred embodiment of our invention, illustrated in fruit-receiving position;

Fig. 2 is a detail perspective view of the pulp disintegrating element;

Fig. 3 is a perspective view of the device in closed position after the juice has been extracted;

Fig. 4 is a longitudinal vertical sectional view through the same; and

Fig. 5 is a plan view of the juice retaining receptacle.

Referring more in detail to the drawings:

1 designates a juice receiving receptacle comprising a cup-shaped member formed of sheet metal and having a cylindrical wall 2, an integral flat bottom 3, and an open top 4 through which is projectable a fruit engaging or impaling member 5.

The impaling member is also constructed of sheet metal and comprises a cone-shaped cup having a rounded top 6 and an outwardly flaring side wall 7 terminating in a laterally projecting peripheral flange 8 of a diameter slightly smaller than the diameter of the juice receptacle so that the impaling member is readily receivable therein as will be hereinafter described.

Fixed to the curved top of the impaling member by rivets 9 is a cap 10 having an upstruck boss or shouldered portion 11 provided with an opening 12 for receiving an end 13 of a shaft 14 which is riveted therein as at 15, the shaft being rotatably mounted in a yoke 16, which comprises a bar 17 having laterally projecting ears 18 and 19 provided with apertures 20 for receiving the shaft and providing a two point bearing therefor.

Riveted to the yoke 16 by the rivets 21 is an arm 22 which, co-acting with a complementary arm 23 projecting laterally from the wall of the receptacle 1, forms a handle for the device, the arm 23 being secured to an ear member 24 riveted to the juice receptacle and having a laterally projecting ear 25 for attaching the end of the arm by fastening devices 26. The arm 22 projects downwardly from the yoke toward the rim of the receptacle, as at 27, and then laterally thereof in substantially parallel alignment with the arm 23 so that the arms may provide means for pivotally attaching the fruit impaling member to the juice receptacle through a hinge element designated 28.

The hinge element 28 comprises a pair of yoke-shaped members 29 and 30 riveted to laterally bent ends 31 and 32 of the arms 23 and 22 respectively, each member having pairs of projecting ears 33 and 34 to receive a pintle 35 for hinging the members together and pivotally mounting the impaling member to the receptacle to permit the impaling member to be swung out of engagement with the receptacle for insertion of the fruit and then swung back to juice extracting position as the fruit is urged into engagement with the pulp engaging member 36.

The juice extractor 36 comprises a semi-elliptic wire form of substantially the shape of the vertical cross section of the fruit impaling member. The wire presents a blunt edge to engage the juice containing cells of the fruit thus enabling the more effective extraction of the juice therefrom. This member has opposed laterally bent hook-shaped ends 37 and 38 for engaging the heads 39 and 40 of pins 41 and 42 that are secured to the bottom of the juice receptacle so that the wire form may be readily detached therefrom for cleaning purposes. The pins are provided with shouldered extensions 43 which project through openings 44 in the receptacle and are riveted to its under side to firmly secure the rivets in position for retaining the wire form 36.

In order to rotate the fruit retaining member 5, the shaft 14 is provided with a crank 45 threadedly secured to a reduced extension 46 of the shaft. It will thus be readily apparent that when the crank is screwed in position, the shaft is retained in the yoke but may be readily removed for cleaning purposes by unscrewing the crank and slipping the shaft from the yoke.

In order to insure positive rotation of the fruit, the member 5 is provided with instruck V-shaped tangs 47 that project inwardly of the member 5 and may project forwardly in the direction of rotation so that the fruit is impaled thereby and positively rotated with the impaling member 5. We prefer to provide the impaling member with two or more rows of tangs 48 and 49 to insure engagement with the various sized fruits such as lemons, oranges and grapefruit, within the capacity of the cone during the juice extracting operation, but this is not essential.

The receptacle 1 is provided with two pouring spouts 50 diametrically opposite each other and on opposite sides of the handle.

In operating the device constructed as described, the impaling member 5 is swung on the hinge member 28 to the position shown in Fig. 1. The fruit is then cut into two parts and one of the portions inserted into the impaling member with the tangs 47 piercing the skin of the fruit. The impaling member is then lowered into engagement with the wire form 36 and while the left hand grips together the arms 22 and 23 of the handle member, the crank 44 is manipulated with the right hand, to rotate the fruit over the wire form. As the pulp gives way by rotation over the juice extractor, the impaling member is gradually and progressively lowered until the arm 22 engages the rim of the receptacle, whereupon all the fruit juice has been extracted and is ready to be removed for use.

The operator continues to grip the handle members 22 and 23 together and by tipping the device sidewise, the juice is poured from the spout 50 of the container into a glass or the like, and as the juice pours out, the seeds and loose pulp are retained by the flange of the impaling member, since, as before stated, its fit is fairly close within the receptacle to allow only space for the juice to escape, after which the skin, pulp and seeds may be removed, or the juice from the other half of the fruit may then be extracted in like manner, leaving the seeds and pulp accumulate in the cup. The juice may be poured from either lip 50, or partly from one side and partly from the other.

Attention is particularly called to the fact that the juice extracting member is wider than the fruit so that the skin is stretched along its plane thereby and as the skin is rotated thereover, the skin moves in an elongated curvilinear path about the form, as shown by the dotted lines in Fig. 5, and it is partly by this peculiar motion that the juice is so efficiently and easily removed. It will also be noted that the hooks on the juice extracting member are so positioned that the rotative movement of the fruit tends to keep them in engagement with the pins, and that the impaling tangs may likewise be positioned toward the direction of rotation so that the tangs easily pierce the skin as it is engaged and disengaged during its movement about the juice extractor.

From the foregoing it will be readily apparent that we have provided a device that is well adapted to the purpose for which it is intended and which will speedily and easily extract juices in a clean and sanitary condition, free from seed, pulp or other objectional matter.

What we claim and desire to secure by Letters Patent is:

1. In a fruit juice extractor, a juice receiving member, pins on the member, a wire loop engaging the pins for deforming the fruit pulp, a fruit impaling member rotatable over the wire loop, and a crank for rotating the said impaling member during the juice extracting operation.

2. In a fruit juice extractor, a juice receiving member, headed pins on the member, an extracting member comprising a wire loop having hooked ends for detachably engaging the headed pins, a fruit retaining member rotatable over the pulp disintegrator, and a crank for rotating the fruit retaining member.

3. A fruit juice extractor including a pair of hingedly connected arms, a conical fruit receptacle rotatably mounted on one of the arms and having a plurality of axially spaced series of impaling members on its inner surface inclined in direction of forward rotation of the receptacle for respectively engaging fruit of different sizes, a juice receptacle on the other arm, and a juice extracting member in the juice receptacle conforming in contour to the interior of the fruit receptacle.

4. In a fruit juice extractor, a juice receptacle, a downwardly divergent wire loop having its free ends removably anchored to the bottom of said receptacle, a fruit impaling member movable into said receptacle over the loop, and means for rotating the fruit impaling member.

5. In a fruit juice extractor, a juice receptacle having headed pins in its bottom, a downwardly divergent wire loop having hooks at its free ends removably engageable with the pins to anchor the loop in the receptacle, a fruit impaling member movable into said receptacle over the loop, and means for rotating the fruit impaling member.

6. In a fruit juice extractor, a juice receptacle, a rotatable fruit impaling member hingedly movable into the receptacle, headed pins in the bottom of the receptacle, and a wire loop having hooks on its free ends engageable with the pins in the direction of forward rotation of the impaling member for anchoring the loop in the receptacle.

7. A fruit juice extractor including a pair of arms, a juice receptacle on one of the arms including an extractor in the receptacle, a rotatable fruit receptacle on the other arm movable into and from the fruit receptacle over the extractor, and having an outwardly extending flange on its free edge interposed between the wall of the juice receptacle and said extractor when the parts are in closed relation to act as a retaining member for the seeds and pulp.

8. In a fruit juice extractor, a fruit carrying member, a juice extracting member lying substantially in a single plane of a greater diameter than the exposed portion of the fruit, for deforming the fruit from a circular to a non-circular shape, and means for moving the fruit carrying member relatively to the extracting member during the juice extracting operation.

9. In a fruit juice extractor, a revolvable holder for the fruit, a juice extracting member lying substantially in a single plane of a greater diameter than the exposed portion of the fruit for deforming the fruit from a circular to a non-circular shape and means for moving the fruit about said extracting member during the juice extracting operation.

10. In a fruit juice extractor, a carrying member for the fruit, a blunt juice extracting member lying substantially wholly in a plane, and means for relatively moving the carrying member and the extracting member during the juice extracting operation.

11. In a fruit juice extractor, a carrying member for the fruit, a juice extracting member lying substantially in a plane of greater diameter than the exposed portion of the fruit, means for moving the holder and extracting member towards each other to deform progressively the fruit over the extracting member, and means for relatively rotating the carrying member and the extracting member during the juice extracting operation.

12. A fruit juice extractor comprising a juice receiving cup, a juice extracting member lying substantiallyy in a vertical plane within the cup, a fruit receiving member, means for holding the fruit within the last named member, and means for relatively rotating the receiving member over the extracting member during the juice extracting operation.

13. The method of extracting the juice from citrous fruit which consist in exposing the portion to be treated and applying a force substantially along a plane while relatively moving the fruit about the plane of action to deform the fruit from a circular to a non-circular shape.

14. In a fruit juice extractor a fruit carrying member having a plurality of axially spaced impaling members on its working surface inclined in the direction of forward rotation to engage the fruit during the juice extracting operation.

15. The method of extracting the juice from citrous friut which consists in exposing the portion to be treated and applying a force substantiallyy along a plane and normal to said exposed portion while relatively moving the fruit about the plane of action to stretch progressively and increasingly the fruit along the plane of action.

16. An article of manufacture, a fruit juice extractor consisting of a blunt arcuate member whose thickness is less than the length or breadth.

17. An article of manufacture, a fruit juice extractor consisting of a single downwardly divergent wire loop.

18. A fruit juice extractor comprising an imperforate cup, a fruit engaging element mounted within said cup, a bell-shaped impaling member having an annular flange at its base and means for rotating the member, arms connected to the cup and the impaling member respectively and cooperating whereby the impaling member may telescope over the fruit engaging element during the juice extracting operation, the impaling member being brought into position that the flange cooperates with the side of the cup to retain seeds, fibre, etc., within the cup when the extracted juice is being poured from the cup.

19. A fruit juice extractor comprising an imperforate cup, a fruit engaging member separable from and supported by said cup whereby juices may be collected in said cup, a bell shaped impaling member of relatively thin material having an annular flange at its base, a shaft secured to said impaling member, means of connection between said impaling member and said shaft permitting a reinforced connection between said relatively thin material and said shaft, a crank secured to said shaft, and arms connected to the cup and the impaling member respectively, and cooperating whereby the impaling member may be moved to a position to permit the placing of fruit between it and the fruit engaging member and thereafter the members may be moved toward each other to retain the fruit, then rotatively to each other to extract the fruit juice and at the same time telescopically of each other during the rotative movement by exerting pressure upon the crank, the said flange cooperating with the inside of the cup to retain seeds within the cup when the extracted juice is being poured from the cup.

20. A fruit juice extractor comprising a friut juice receiving cup, a fruit engaging member separable from and associated with said cup whereby juices may be collected in said cup, means for preventing movement of said friut engaging member during juicing operation, a bell-shaped impaling member of relatively thin sheet metal material having a plurality of pointed, prong-like, fruit engaging members formed integral therewith, said impaling member having mounted thereon at its apex, a reinforcing member engaging a substantial portion of the surface of said apex, a shaft operatively secured to said reinforcing member for operating said impaling member, said shaft projecting outwardly therefrom and its connection, together with said reinforcing member, constituting substantially the sole support for the impaling member, a crank secured to said shaft and cooperating arms connecting said cup and the impaling member respectively, said arms supporting upper and lower spaced journals in which the crank shaft rotates, the cooperating arms permitting the impaling member to be moved to a position where fruit may be placed between it and the fruit engaging member and thereafter permitting the members to be moved towards each other to retain the fruit, then rotatively to each other to extract the fruit juice and telescopically of each other during the rotative movement.

In testimony whereof, we affix our signatures.

CLARENCE E. ELLIOTT.
LEONARD O. NICHOLS.